F. D. WEISSE.
SET OF TEETH FOR PRACTICE WORK IN DENTAL SURGERY.
APPLICATION FILED JAN. 27, 1913.

1,108,290. Patented Aug. 25, 1914.

WITNESSES: Heinrich Schweitzer
E. Bingham Tripp

INVENTOR.
Faneuil D. Weisse

UNITED STATES PATENT OFFICE.

FANEUIL D. WEISSE, OF NEW YORK, N. Y.

SET OF TEETH FOR PRACTICE-WORK IN DENTAL SURGERY.

1,108,290.

Specification of Letters Patent. Patented Aug. 25, 1914.

Application filed January 27, 1913. Serial No. 744,338.

*To all whom it may concern:*

Be it known that I, FANEUIL D. WEISSE, a citizen of the United States, residing at New York, in the county and State of New York, have invented a new and useful Combination in Sets of Teeth for Practice-Work in Dental Surgery, of which the following is a specification.

Sets of teeth for practice work in dental surgery are known under the name of typodonts or odontotypes. There are typodonts made of celluloid blocks from which a collection of teeth are pressed and vulcanized into suitable shape, the base supporting the celluloid teeth being made of the same celluloid. The teeth upon such typodonts are not individually movable.

Odontotypes are described in U. S. Patent No. 707810, Aug. 26, 1902, consisting of a collection of teeth supported in sockets formed by a flexible material and an odontotype has been on the market in which teeth of white rubber or ivory are glued into sockets formed by vulcanized rubber. Odontotypes having a base of flexible material do not afford the natural relation in the position of the teeth after an operation has been performed by which an individual movement of the teeth was required; odontotypes constructed of teeth set into sockets of vulcanized rubber require a separate vulcanization of the rubber and a special fastening of the teeth in the prepared sockets by glue or rivets.

It has been in use to set porcelain teeth or metallic teeth in rubber base plates for artificial dentures in order to vulcanize these parts subsequently but it has never been attempted to mount teeth made of celluloid directly into an elastic base body of gutta-percha.

The object of my invention is a set of single teeth for practising purposes made of celluloid or celluloid compound mounted into natural relation upon a base of gutta-percha.

Figure 1:
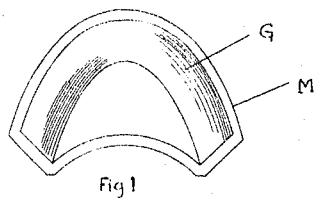
Figure 2:
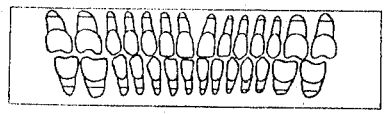
Figure 3:
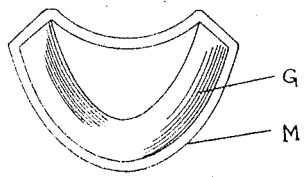
Figure 4:
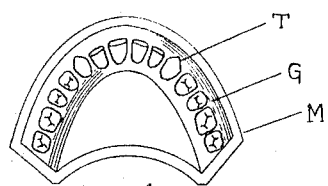
Figure 5:
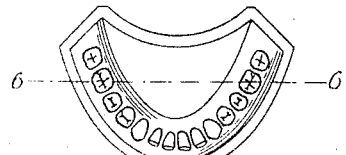
Figure 6:

Figure 1 of the accompanying drawing shows the gum surface of a base body for upper teeth. Fig. 2 is the facial view of a set of single celluloid teeth unmounted. Fig. 3 is the top view of a base body for the reception of lower teeth. Figs. 4 and 5 illustrate base bodies for upper and lower teeth with the teeth set into position. Fig. 6 shows in cross-section teeth, gutta-percha and metallic casing.

The reference letter, G, indicates the elastic substance which preferably consists of a mixture of the juice of gutta-percha trees, sulfur and coloring ingredients. Preparations of this kind known as elastic gutta percha become plastic and can be easily worked with a spatula at a temperature of 80 to 100 degrees centigrade while they set to a desirable resistant mass at about 30 degrees without loosing the elasticity. It is well advisable to encircle such an elastic body by an open metallic casing, M, through which the heat may be distributed to the gutta-percha substance held in the casing.

It is essential that the elastic base body is not vulcanized as the vulcanization will remove the plasticity and thereby the possibility of molding. The setting of teeth in an elastic substance is briefly mentioned in my copending application for Letters Patent Serial No. 723,276, filed Oct. 1, 1912. The method of fastening teeth consists simply in forcing the roots in the warmed elastic mass, directing them into natural relation upon an articulator and finishing the surrounding gutta-percha surface with a warm spatula. Teeth mounted in an elastic gutta-percha preparation may be moved individually by a separator as is required in the separation of two adjoining teeth in order to prepare cavities on the approximal surfaces; the base body of elastic gutta-percha cares to force the teeth back in their original position after the separator is removed. Of great advantage is the mounting of single sets of teeth in a moldable elastic base body for the practising of crown and bridge work, by extracting one or more teeth from a full set and filling the artificial alveolus with the same moldable elastic gutta-percha substance. A hot spatula will easily join the additional gutta-percha with the original base gutta-percha thus forming one homogeneous mass. Teeth made of celluloid or celluloid compound are preferable to others as they can be formed from molds and thus obtain a perfect anatomical shape superior to that obtained by carving.

Having now fully described my invention I claim:

In an artificial set of teeth for practice work of dental surgery the combination of a number of single celluloid teeth and a base of gutta-percha, said single celluloid teeth set into said gutta-percha substantially as described and shown.

FANEUIL D. WEISSE.

Witnesses:
HEINRICH SCHWEITZER,
E. BINGHAM TRIPP.